United States Patent [19]
Pahl et al.

[11] Patent Number: 5,927,824
[45] Date of Patent: Jul. 27, 1999

[54] VEHICLE HYDRAULIC BRAKE SYSTEM

[75] Inventors: Arnold Pahl, Markgroningen; Wolf-Dieter Jonner, Schmidhausen; Norbert Alaze, Markgoeningen; Helmut Pueschel, Marbach; Thomas Isella, Markgroeningen; Guenther Schmidt, Tauberbischofsheim; Karl-Heinz Willmann, Freiberg; Rolf Hummel, Steinenbronn; Elmar Mueller, Markgroningen; Johann Herr, Vaihingen; Roland Holzmann, Moeglingen; Guenter Dzierzawa, Waiblingen; Martin Moehle; Guenter Krenz, both of Steinheim; Erika Mank, Ludwigsburg; Hans-Juergen Herderich, Kernen, all of Germany

[73] Assignee: Robert Bosch GmbH, Stuttgart, Germany

[21] Appl. No.: 08/875,387

[22] PCT Filed: Aug. 16, 1996

[86] PCT No.: PCT/DE96/01524

§ 371 Date: Sep. 29, 1997

§ 102(e) Date: Sep. 29, 1997

[87] PCT Pub. No.: WO97/21570

PCT Pub. Date: Jun. 19, 1997

[30] Foreign Application Priority Data

Nov. 25, 1995 [DE] Germany ............................ 1 95 439 61
May 17, 1996 [DE] Germany ............................ 1 96 199 85

[51] Int. Cl.$^6$ ...................................................... B60T 8/34
[52] U.S. Cl. .................................... 303/113.2; 303/115.4; 303/116.1; 303/119.1

[58] Field of Search ............................ 303/113.2, 119.1, 303/116.1, 116.2, 115.1, 115.4, 115.2, 10, 11, 139

[56] References Cited

U.S. PATENT DOCUMENTS 5,240,314  8/1993  Morita ............................... 303/113.2 X
5,401,083  3/1995  Altmann et al. ..................... 303/113.2

FOREIGN PATENT DOCUMENTS 482367   4/1992  European Pat. Off. .
4226646  2/1994  Germany .
4445401  6/1995  Germany .

*Primary Examiner*—Peter M. Poon
*Attorney, Agent, or Firm*—Edwin E. Greigg; Ronald E. Greigg

[57] ABSTRACT

A vehicle hydraulic brake system having brake pressure modulation valve assemblies, between a dual-circuit master cylinder and wheel brakes of vehicle wheels. The pump device is embodied as a low-pressure pump with the brake pressure modulation valve assemblies be assigned a first and second return pump and that in the automatic braking mode the first pressure chamber is made to communicate with a first return pump and the second pressure chamber is made to communicate with the second return pump, on the inlet side in both cases. The low-pressure pump, in the automatic braking mode, generates charge pressure for the return pumps that is substantially below a maximum brake pressure, and the return pumps generate the maximum projected brake pressure and serve, in the additionally possible anti-lock mode, to return pressure fluid from the wheel brakes to the master cylinder. The vehicle brake system is an inexpensive low-pressure pump that offers a high possible capacity of the return pumps in the automatic braking mode.

20 Claims, 7 Drawing Sheets

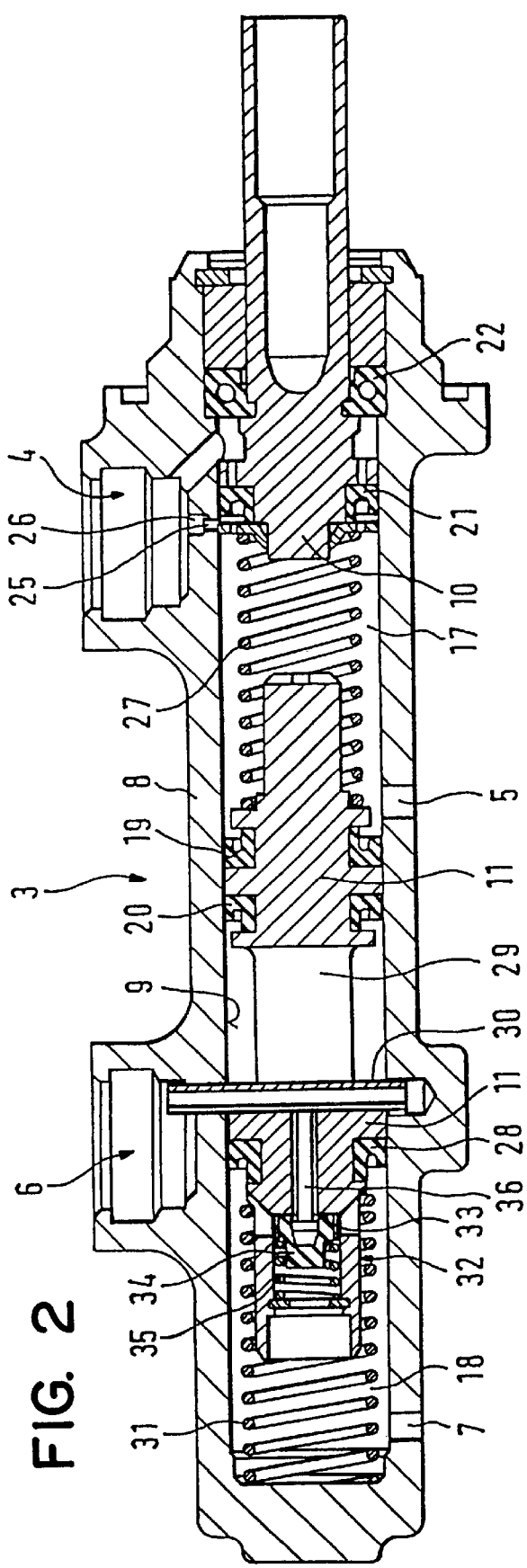
FIG. 2
FIG. 3
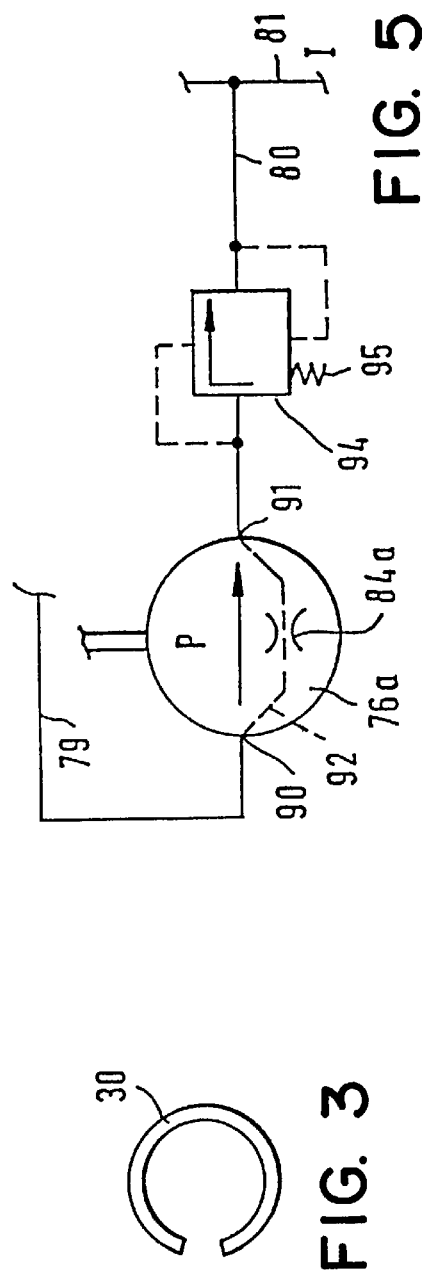
FIG. 5

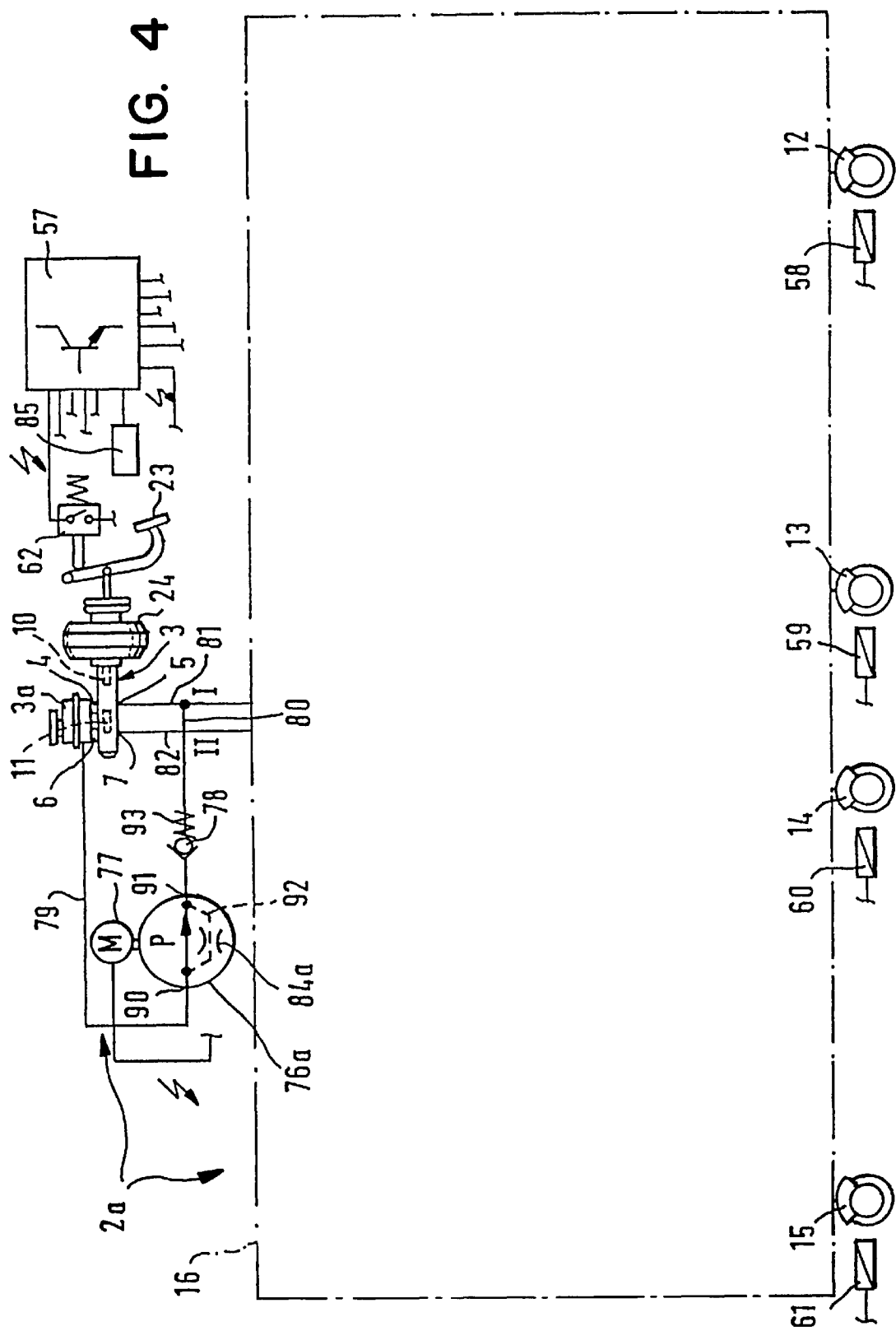

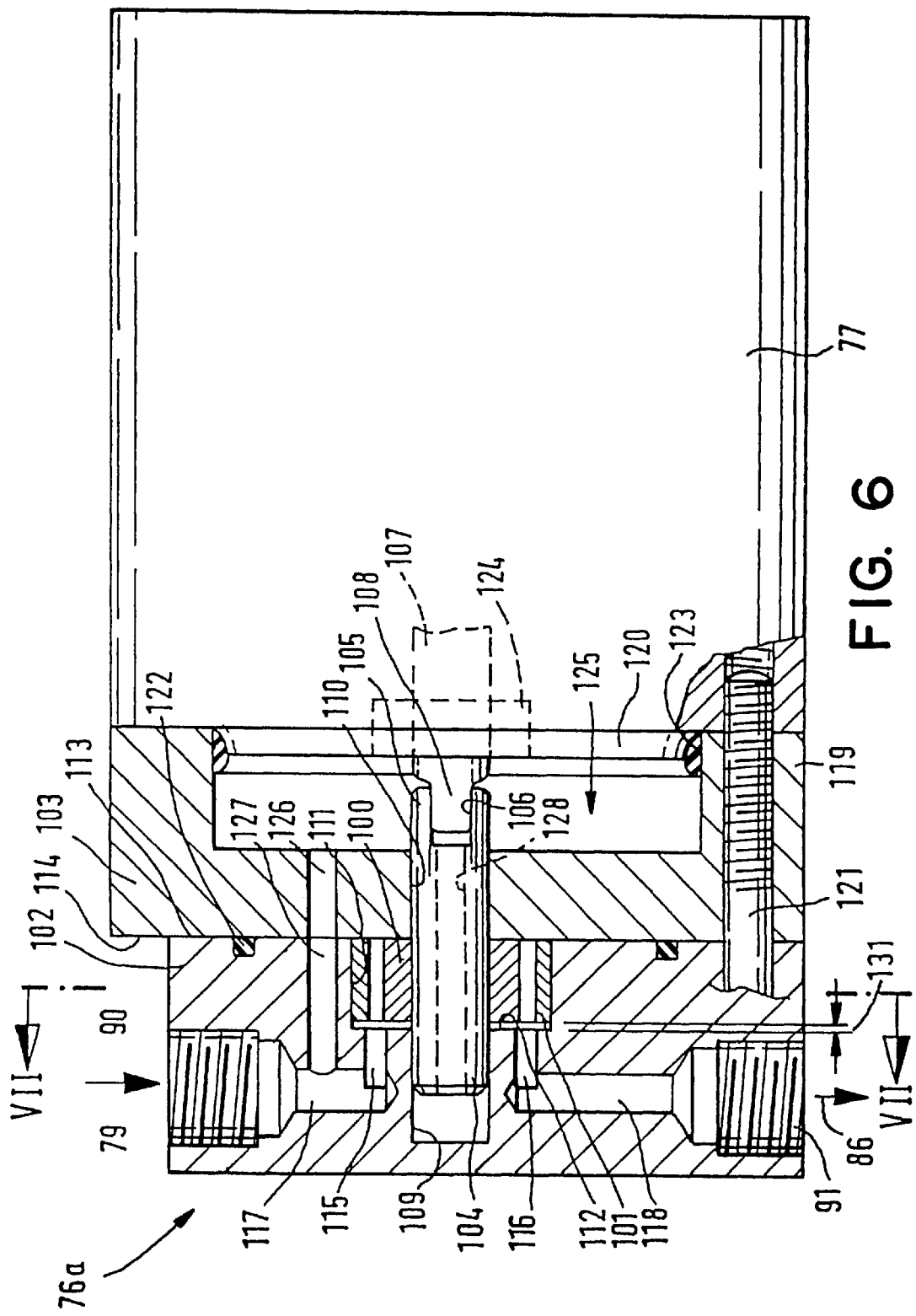

VEHICLE HYDRAULIC BRAKE SYSTEM

This invention is directed to a brake system and more particularly to a vehicle hydraulic brake system.

BACKGROUND AND PRIOR ART

From FIGS. 1 and 4 of German Patent Application DE 44 45 401 A1, a vehicle hydraulic brake system is known that has a master cylinder which has a housing and in it a bore in which a first piston can be displaced as a function of the depression of a brake pedal. A second piston is disposed displaceably on a side of the first piston remote from the brake pedal. The first and second pistons between them define a first pressure chamber, which communicates with a first connection embodied on the housing and with a second connection. The second piston on a side remote from the first pressure chamber defines a second pressure chamber, which communicates with a third connection embodied on the housing and with a fourth connection. The first piston blocks off the communication between the first connection and the first pressure chamber, and the second piston blocks off the communication between the third connection and the third pressure chamber—in each case when the brake pedal is depressed. A supply container is provided for storing pressure fluid and for communicating with the third connection of the master cylinder. A valve assembly is provided for opening or closing the communication between the first connection of the master cylinder and the supply container. A pump device, which has a suction connection communicating with the supply container and a pressure connection communicating with the second connection of the master cylinder and which aspirates the pressure fluid from the supply container and pumps it to the second connection. A plurality of wheel brake cylinders are provided for associated wheels, in order to brake these wheels, the brake cylinders are divided into a first group of wheel brake cylinders and a second group of wheel brake cylinders; having first brake pressure modulation valve assemblies, which are disposed between the second connection of the master cylinder and the first group of wheel brake cylinders; having second brake pressure modulation valve assemblies, which are disposed between the fourth connection of the master cylinder and the second group of wheel brake cylinders. A control unit, in order to actuate the valve assembly for opening or closing the communication between the first connection of the master cylinder and the supply container an agreement with an operating mode selected from among an opening operating mode and a closing operating mode is provided. The pump device is embodied as a high-pressure pump, whose feed pressure is limited by a pressure limiting valve to a pressure that is at least as high as a maximum brake pressure to be supplied to at least one wheel brake cylinder. As a result, this hydraulic vehicle brake system is capable without actuation of the brake pedal of generating brake pressures for traction control, also known as drive slip control, by conditional braking of at least one drivable wheel. The hydraulic vehicle brake system of FIGS. 1 and 4 have the disadvantage that aside from normal braking by brake pedal actuation, it is arranged for only the traction control mode, and that the high pressure that can be furnished by this pump device requires a first connection on the master cylinder that can withstand this high pressure. Accordingly, it is not possible to use a normal master cylinder with the known connections, in which as connecting elements to the respective supply container merely elastic rubber rings are placed. Instead of the communication via this kind of elastic rubber ring, a screw connection would have to be provided, for instance, which is for instance identical to screw connections for the second connection and the fourth connection. It is advantageous, however, that by means of the second connection the pump device builds up a pressure in the pressure chamber that by means of the second piston also produces a pressure rise in the second pressure chamber and this pressure rise is available through the fourth connection to the second brake pressure modulation valve assemblies. Accordingly—beginning at one outlet of the pump device—only one hydraulic communication with the master cylinder is required.

A further hydraulic vehicle brake system known from FIG. 5 of DE 44 45 401 A1 omits the pump device, present in the above-described vehicle brake system, by using so-called return feed pumps of an anti-lock device; the return pump associated with the second connection of the master cylinder supplies itself with pressure fluid from the supply container through a suction line, into which a normally blocking, electrically controllable 2/2-way valve is incorporated. However, this has the disadvantage that incorrect control or a defect of this 2/2-way valve causes an opening of the brake circuit originating at the second connection of the master cylinder, with the result that during the anti-lock mode, pressure fluid can escape to the supply container, and the brake pedal can sink deeper. Clearly this can have the result that an intrinsically available reserve stroke of the first piston will be used up, with the loss of braking power. Another disadvantage is that this return pump supplies itself with pressure fluid through the aforementioned suction line and the aforementioned 2/2-way valve only incompletely, for instance if at winter temperatures this temperature fluid is viscous, or if at summer temperatures the development of vapor bubbles from an air draft cannot be precluded. Inadequate filling of this self-supplying return pump naturally causes a defective pumping capacity and consequently a disadvantageously slow rise in brake pressure or an inadequate rise in brake pressure. A slow rise in brake pressure in the traction control mode is disadvantageous especially when traveling over ice or snow.

A vehicle brake system known from German Patent Application DE 42 26 646 A1 is arranged to avert the danger of wheel locking in braking and also for automatic braking, for instance for traction control, for distributing braking force between the front and rear wheel brakes, and/or for individual braking of at least one of the vehicle wheels for the sake of stabilizing the vehicle if there is a tendency to oversteer, for the sake of obtaining vehicle steerability if there is a tendency to understeer, for the sake of the best possible adherence in terms of driving dynamics to the vehicle motion curve specified by the steering angle, as a result of the fact that if there is a tendency to oversteer and understeer or to depart from the predetermined path curve, this curve is corrected by braking or by boosted braking of at least one wheel. This vehicle brake system likewise has a master cylinder with four connections, a supply container, two brake circuits connected to the master cylinder for a plurality of wheel brake cylinders of a plurality of wheels, and brake pressure modulation valve assemblies disposed between them with multiposition valves and with one pump per brake circuit, which pump functions in operation to reduce the danger of wheel locking or in the automatic braking mode furnishes pressure at least at a level sufficient for braking; for automatic braking, valve assemblies are provided between the pressure outlets of these pumps and the respective connections of the master cylinder which are controlled for automatic braking from their basic position into control positions so that quantities of pressure fluid will flow out of these pumps to the master cylinder only once projected pressures are reached. The aforementioned valve assemblies accordingly have the function on the one hand of a multi-position valve which is open for normal braking and on the other, the function of a safety valve that protects the applicable pump against an overload. Inlets of the two pumps are supplied with pressure fluid from the supply container of the master cylinder by a common charge pump unit, through electrically controllable multiposition valves. To that end, the charge pump unit furnishes a pressure on the order of magnitude of 5 bar, for instance. The charge pump unit includes a charge pump, a pressure limiting valve connected to the outlet of the pump, and a throttle also connected to this outlet, which throttle communicates with the supply container and accordingly with one inlet of the charge pump. It is advantageous that the charge pump needs to generate a pressure only on the aforementioned order of magnitude of 5 bar and therefore produces little noise, absorbs little drive output, and is accordingly inexpensive. It can be considered disadvantageous that if the supply container is inadequately filled and under the influence of acceleration or if the pressure fluid is foaming, the charge pump will aspirate air, and some of this aspirated air may force its way into both pumps and thus into both brake circuits, causing volumetric elasticities there. Such volumetric elasticities are known to be capable of causing inadequate braking action.

ADVANTAGES OF THE INVENTION

The vehicle hydraulic brake system has the advantage that the supply to the brake circuits for the automatic braking mode is attained by means of the charge pump that merely furnishes low pressure and therefore requires little capacity. Correspondingly little pump noise is generated. A further advantage is that a conventional master cylinder with typical plug-type connections can be used for the first and third connections. Accordingly, a mass-production supply container can be used for the master cylinder. Since such mass-production supply containers and master cylinders can be plugged together quickly and simply, there is also a price advantage over the construction necessary for the vehicle brake system of DE 44 45 401 A1. Another advantage is that, as already indicated by the advantage named, the supply container is plugged directly together with the master cylinder, so that contrary to what DE 44 45 401 A1 proposes, no additional structural height is needed. Moreover, a hydraulic unit, that is, an arrangement of valves and pumps, of an already existing type can be used, of the kind described in German Patent DE 42 32 311 C1. This saves development costs and makes the manufacture of the hydraulic unit and the furnishing of spare parts less expensive because existing means of production can continue to be used.

By the provisions recited herein, advantageous further features of and improvements to the vehicle brake system are possible. The characteristics set forth herein define an advantageously inexpensive way of furnishing low pressure for the vehicle brake system of the invention, because as a result, the engineering expense for a charge pressure limiting valve downstream of the pump can be spared, and at least some of the engineering expense for a return conduit with a built-in throttle, connecting the pump outlet to the pump inlet outside the pump, can be spared. The characteristics set forth herein define an exemplary embodiment that is based on the generic type known as "gear pumps" and that keeps the engineering expense low for the at least one return conduit, which is dimensioned as a throttle. The characteristics set forth herein define an exemplary embodiment with a so-called internal gear ring pump, also known as a Gerotor pump. The definitive characteristics set forth define an exemplary embodiment for a valve required in the vehicle brake system of the invention, in which the flow through the valve must be in no more than one direction. The characteristics set forth herein likewise define an exemplary embodiment for such a valve; by using a spring that defines a pressure difference between the outlet of the low-pressure-generating pump and the return pump, such a high pressure drop is brought about that when the low-pressure pump is in operation or is stopped and air may be present in the low-pressure pump, this air cannot be aspirated by a self-aspirating return pump. In other words, the spring of the differential pressure regulating valve is dimensioned such that with the low-pressure pump stopped, the pressure fluid contained in the return pump would tend to form vapor bubbles, for instance.

The characteristics set forth herein define an inexpensive way to combine the pump of the invention with the motor associated with it.

A flow-hindering constriction is embodied as a throttle element inserted into the first connection of the master cylinder; this element is preferably retained in the first connection by a connection flange of the supply container. In this way, the flow-hindering constriction can be realized at minimal expense without any modification whatever of the master cylinder, the supply container, or any other part of the vehicle brake system.

In a feature of the invention defined, the flow-hindering constriction is embodied as a throttle element mounted on a face end of the first piston oriented toward the first pressure chamber. This feature has the advantage that the throttle element is disposed in the interior of the master cylinder, where it is largely protected against manipulation.

A further feature of the invention defined herein after contemplates a check valve connected parallel to the flow-hindering constriction of the master cylinder; this check valve can be manufactured simply and hence economically along with the throttle element. When the vehicle brake system is being filled, brake fluid flows through the check valve; thus the vehicle brake system is filled parallel to the flow-hindering constriction and consequently at low flow resistance. This shortens the filling time.

BRIEF DESCRIPTION OF THE DRAWINGS

Exemplary embodiments of the hydraulic brake system according to the invention are shown in the drawing and described in further detail below. Shown are FIG. 1, a first exemplary embodiment of the vehicle brake system according to the invention;

FIG. 2, a master cylinder of the vehicle brake system of the invention in longitudinal section;

FIG. 3, a detail of the master cylinder;

FIG. 4, a further exemplary embodiment of the vehicle brake system of the invention;

FIG. 5, a variant of the exemplary embodiment of FIG. 4;

FIG. 6, a longitudinal section through a charge pump of the vehicle brake system of the invention;

DESCRIPTION OF THE EXEMPLARY EMBODIMENTS

Figure 1:
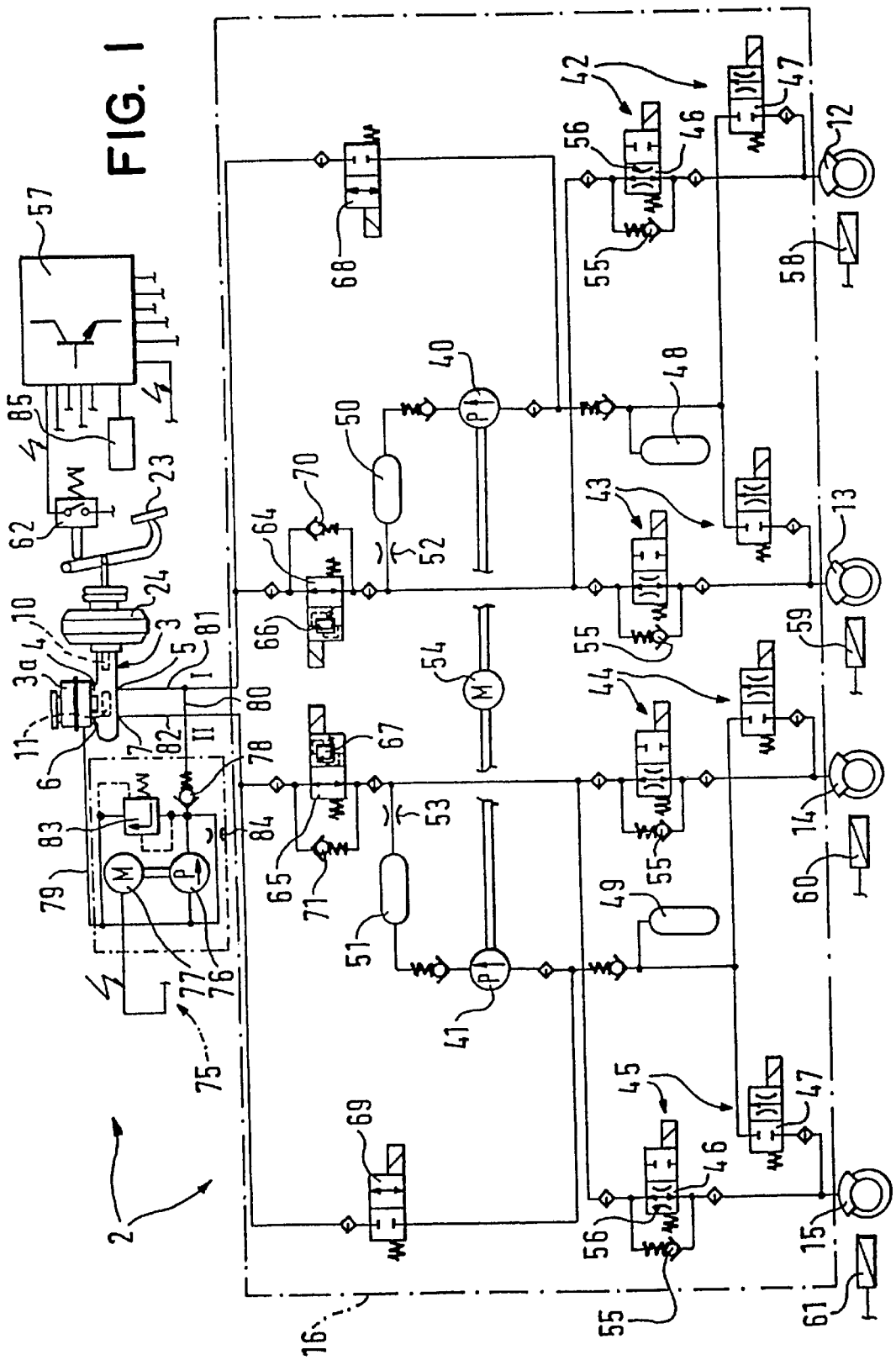

The hydraulic vehicle brake system 2 of FIG. 1 has a dual-circuit master cylinder 3 with a supply container 3a, a first connection 4, a second connection 5, a third connection 6 and a fourth connection 7, and in a housing 8 a bore 9, which is shown in FIG. 2, and in this bore, a first piston 10 which is displaceable as a function of the depression of the brake pedal and a likewise-displaceable second piston 11, two brake circuits I and II, and wheel brakes 12, 13, 14 and 15 associated with the brake circuits I and II, each with at least one wheel brake cylinder, not shown, and one anti-lock device 16, located between the master cylinder 3 and the wheel brakes 12–15, which is further developed for automatic braking of at least one of the wheel brakes 12–15.

The master cylinder 3 has a first pressure chamber 17, between the first piston 10 and the second piston 11, and a second pressure chamber 18 adjacent only to the second piston 11. Two sealing cuffs 19, 20 attached to the second piston 11 act in opposite directions and seal off the first pressure chamber 17 and the third connection 6 from one another. The first piston 10 likewise has a first sealing cuff 21 and is displaceable through a further sealing cuff 22 by means of a brake pedal 23, for instance with boosting by a brake booster 24. The sealing cuff 22 is held in the housing 8. Associated with the first connection 4, the master cylinder 3 has a blow bore 25 that for instance discharges into the bore 9. This blow bore is disposed in a manner known per se such that if, as shown in FIG. 2, the first piston 10 is in its outset position, the blow bore connects the first connection 4 with the first pressure chamber 17. The blow bore 25 is located near the sealing cuff 22, so that it is overtaken by the sealing cuff 22 upon only slight displacement of the first piston 10. The blow bore 25 is hydraulically separate from the first pressure chamber 17. As shown in FIG. 2, the blow bore 25 has a relatively small diameter in comparison with a connection bore 26 which is located above it and discharges into the first connection 4. Because of the smaller diameter of the blow bore 25 compared with the connection bore 26, the blow bore forms the narrowest point and accordingly the most strongly throttling bore in the case where pressure fluid flows through it. A restoring spring 27 determines the outset position of the first piston 10. The restoring spring 27 is supported on the second piston 11. The second piston 11 likewise has a sealing cuff 28 for sealing off the second pressure chamber 18. A recess 29 is machined into the second piston 11 and extends in the manner of an oblong slot in the longitudinal direction of the second piston 11. Extending crosswise to the second piston 11 and through this recess 29 is a hollow stop element 30. This hollow stop element 30 rests on both of its ends in the housing 8. The stop element 30 as shown in FIG. 3 is embodied with a C-shaped cross section, such that it hydraulically connects the third connection 6 with the bore 9. A second restoring spring 31 is supported in the housing 8 and presses the second piston 11 toward the first piston 10 into an outset position that is defined by the stop element 30.

Located inside the second piston 11 is a so-called central valve 32 with a seat face 33 on the second piston 11, an elastic closing body 34 that can be applied against the seat face 33, a closing spring 35 acting on the closing body 34, a control tappet 36 that carries the closing body 34, and a longitudinal bore 37, which is located in the second piston 11 and relative to which the control tappet 36 has radial play. In the outset position of the second piston 11, as shown in FIG. 2, the control tappet 36 is urged by means of the closing spring 35 along the way via the closing body 34 toward the stop element 30 and rests on it. The closing body 34 is axially spaced apart from the seat face 33. Pressure fluid can therefore flow through the central valve 32 between the seat face 33 and the closing body 34 and through the longitudinal bore 37 around the control tappet 36. Consequently, the second pressure chamber 18 communicates through the longitudinal bore 37 with the recess 29 and thus also communicates through the hollow stop element 30 with the third connection 6. In practice, the stop element 30 is embodied as a so-called tensioning pin, or in other words an element that is formed into the aforementioned C-shaped cross section from a strip of spring sheet metal.

It can be seen that the longitudinal bore 37 and the inserted control tappet 36 form a constriction, depending on how great the aforementioned radial play chosen is, and this constriction acts as a kind of throttle when there is a flow through it. A preselected spacing between the seat face 33 and the closing body 34 likewise hinders a flow therethrough and accordingly acts as a kind of throttle. If a small spacing is chosen, the central valve additionally takes on the task of a throttle. The master cylinder 3 shown in FIG. 2 is a product of Alfred Teves GmbH and is used in brake systems that are arranged for anti-lock and/or traction control operation.

Alfred Teves GmbH also produces master cylinders in which unlike FIG. 2 the first piston 10 is also equipped with a central valve of the type described. To describe the invention, for the sake of simplicity, a version in accordance with FIG. 2 has been selected, in order to demonstrate that a throttling action can be generated between the connections 4 and 5 by various means. In the exemplary embodiments mentioned, a throttling action is effected using commercially available means.

The anti-lock device 16 is by way of example an anti-lock device of the so-called return-pump type that can be learned from German Patent DE 42 32 311 C1, and it has one return pump 40 for brake circuit I and one return pump 41 for brake circuit II. The anti-lock device 16 also has a separate brake pressure modulation valve assembly 42, 43, 44 and 45 for each of the wheel brakes 12–15, each such arrangement comprising one brake pressure buildup valve 46 and a respective brake pressure reduction valve 47, and for each brake circuit I and II it also has a respective reservoir chamber 48 and 49. A first damper chamber 50 for brake circuit I and a second damper chamber 51 for brake circuit II as well as a damper throttle 52 and 53, respectively, are also provided by way of example. A motor 54 is assigned to the return pumps 40 and 41 to drive them. Beginning at the wheel brakes 12–15, the brake pressure buildup valves 46 respectively assigned to them can be bypassed by means of check valves 55 in the direction of the master cylinder 3 when there is a pressure drop around the respective brake pressure buildup valve 46. As an example, the brake pressure buildup valves 46 are combined with throttles 56.

The brake pressure buildup valves 46, which are normally open, are located between the respective wheel brakes 12–15 and the master cylinder 3, so that pressures generated in the master cylinder 3 by actuation of the brake pedal 23 normally reaches the wheel brakes 12–15. Brake pressure reduction valves 47 likewise respectively connected to the wheel brakes 12–15 are closed in their normal position and in the electrically controlled position enable a throttling flow through them, and on the inlet side they communicate with the return pump 40 and 41 of the respective brake circuit and with the storage chamber 48 and 49. On the outlet side, the damper chambers 50 and 51 adjoin the respective return pumps 40 and 41. The throttles 52 and 53 follow in the direction toward the master cylinder 3 and toward the respective brake pressure buildup valves 46.

The anti-lock device 11 also includes the control unit 57, which is shown in outline form in FIG. 1, as well as wheel rotation sensors 58–61, which are associated with the wheels, not shown, that can be braked by means of the wheel brakes 12–15 and to which the control unit 57 is connected. The individual valves 46 and 47 of the brake pressure modulation valve assemblies 42, 45 on the one hand and the motor 54 on the other are connected to the control unit 57. A brake pedal switch 62 or the like may also be disposed in the region of the brake pedal 23, for instance, and communicate with the control unit 57.

If a pressure generated in the master cylinder 3 causes the danger of wheel locking for instance at the wheel associated with the wheel brake 12, then the associated brake pressure buildup valve 46 is closed, and depending on the magnitude of the threat of wheel locking the brake pressure reduction valve 47 is opened for at least some period of time, and the motor 54 for driving the return pump 40 is turned on. As a consequence, the pressure of the master cylinder 3 is blocked off from the wheel brake 12, and pressure fluid flows out of the wheel brake 12 toward the reservoir chamber 48 and toward the return pump 40, bringing about a reduction of brake pressure and hence a lessening of the threat of wheel locking. The pressure fluid flowing to the return pump 40 is pumped by the pump back to the master cylinder 3 through the damper chamber 50 and the damper throttle 52. Once the danger of wheel locking has been adequately diminished, the brake pressure reduction valve 47 is closed, and the return pump 40 evacuates the reservoir chamber 48. Accordingly, the return pump 40 assures that pressure fluid let out of a wheel brake in the anti-lock mode is available for generating brake pressure again in the master cylinder 3.

Since in the example one brake pressure modulation valve assembly per wheel brake 12–15 is provided, the control unit 57 is preferably arranged so that it individually controls the brake pressure modulation valve assemblies assigned to the individual wheels in the event of various threats of wheel locking of those wheels.

For automatic braking, the anti-lock device 16 is additionally equipped with a switchover valve 64 for brake circuit I and a further switchover valve 65 for brake circuit II, as well as with pressure limiting valves 66 and 67 and controllable multiposition valves 68 and 69. The switchover valve 65 and 66 are incorporated into brake circuits I and II between the respective throttles 52 and 53 and the master cylinder 3; the switchover valves 64 and 65 are also located between the master cylinder 3 and the brake pressure modulation valve assemblies 42, 43 on the one hand and 44, 45 on the other, and the latter can be supplied with quantities of pressure fluid and hence with pressure in principle by the return pumps 40 and 41 through the respective throttles 52 and 53. The pressure limiting valves 66 and 67, in this example, are integrated with the switchover valves 64 and 65 and to that end, for instance in accordance with the known prior art, the switchover valves 64 and 65 are embodied as electromagnetically actuatable seat valves; closing elements are pressed onto valve seats via pressure limiting springs. The combination of the switchover valves 64, 65 and the pressure limiting valves 66, 67 can be bypassed by means of check valves 70 and 71, so that whenever there is a switchover to the automatic braking mode, and given adequate actuation of the brake pedal 23, pressure from the master cylinder 3 can be propagated to the brake pressure modulation valve assembly 42–45. The controllable multiposition valves 68 and 69 are for example embodied as electromagnetically controllable 2/2-way valves and are located between the second connection 5 of the master cylinder 3 and the return pump 40 on the inlet side thereof and between the fourth connection 7 of the master cylinder and the return pump 41, again on its inlet side. The multiposition valves 68, 69, in this electromagnetic version, are normally closed. Opening of these 2/2-way valves 68, 69 has the effect that the return pumps 40, 41 communicate through these two 2/2-way valves 68, 69 with the connections 5 and 7 of the master cylinder 3. If the return pumps 40 and 41 are embodied as self-filling pumps, then depending on the temperature-dependent property of the pressure fluid in the supply container and in brake circuits I and II, they can fill themselves at least partially.

The control unit 57 is further embodied for automatic braking in accordance with the further embodiment of the anti-lock device 16. To that end, in order to turn on a motor 54 for the automatic braking, it is arranged for activating the pressure limiting function within the valve combination 64, 66 and 65, 67 and opening the multiposition valves 68, 69. As a consequence, the return pumps 40 and 41, if they are embodied as self-aspirating, can supply themselves with pressure fluid through the multiposition valves 68 and 69 and can force pressure fluid upstream of the valve combinations 64, 66 and 65, 67, upstream of the check valves 70 and 71, and upstream of the various brake pressure modulation valve assemblies 42, 45. The rate of pressure rises on the outlet side of the return pumps 40 and 41 is dependent on the stroke frequency and on the extent to which the return pumps 40, 41 are filled on the occasion of filling strokes.

To improve the filling of the return pump 40 and 41 in accordance with the invention, the hydraulic vehicle brake system 2 is assigned a pump device 75. In the exemplary embodiment, this pump device 75 includes at least one pump 76, one motor 77, and on the outlet side of the pump 76 a check valve 78. On the inlet side by means of a suction line 79 and on the outlet side downstream of the check valve 78, the pump 76 communicates with a charge pressure line 80. The suction line 79 originates at a supply container 3a above the master cylinder 3. The charge line 80 discharges into a master brake line 81, which for brake circuit I begins at the connection 5 of the master cylinder 3 and leads to the anti-lock device 16. Brake circuit II has a master brake line 82, which extends from the fourth connection 7 of the master cylinder likewise to the anti-lock device 16. By way of example, a charge pressure limiting valve 83 can be provided downstream of the pump 76 in accordance with German Patent DE 42 32 311 C1. A throttle 84 may also be present, which has at least the property that if the motor 77 is turned off, there can be no pressure, or pressure vanishes, between the pump 76 and the check valve 78, and thus pressure generated even if the brake pedal 23 is actuated weakly acts in the closing and hence sealing sense in the check valve 78. The control unit 57 is also arranged such that it turns on the motor 77 for automatic braking, and the pump 76 is thus driven.

Turning on the pump 76 causes pressure fluid to flow through the check valve 78 and the charge pressure line 80 into the master brake line 81, and depending on conditions it also causes a flow of pressure fluid to the first pressure chamber 17. As a consequence, the first pressure chamber 17 and the blow bore 25 have a flow through them. The flow through the blow bore 25, because of the narrow and hence throttling cross section of this bore, causes a pressure difference between the first pressure chamber 17 and the supply container 3a of the master cylinder 3. This pressure backed up by means of the blow bore 25 has a driving effect on pressure fluid located between the charge pressure line 80 and the 2/2-way valve 68. A flow of pressure fluid is created by opening the multiposition valve 68 and turning on the return pump 40. This backed-up pressure can accordingly at least reinforce the filling of the return pump 40 or even take on that task completely, so that in the latter case the return pump 40 can be embodied as a free piston pump in a manner that is adequate for the anti-lock mode.

The pumping capacity of the pump 76 and the cross section of the connection bore 26, and if the throttle 84 is present its cross section as well, are adapted to one another such that at least in winter temperatures, a pressure on the order of magnitude of 5–10 bar, for instance, is backed up in the first pressure chamber 17 of the master cylinder 3. Such a pressure is then sufficient, if the pressure fluid in the master brake line 81 and inside the anti-lock device 16 is viscous, to make the theoretical pumping capacity of the return pump 40, which can be determined from the stroke frequency and the stroke volume, advantageously utilizable.

In a manner that is part of the invention, an available pressure in the first pressure chamber 17 of the master cylinder 3 is also utilized for displacing the second piston 11, in the process closing the central valve 32, and building up pressure in the second pressure chamber 18, in such a way that with pressure fluid from the second pressure chamber 18, by means of the aforementioned 2/2-way valve 69 which should also be opened, the return pump 41 can be well filled as well in order to achieve high pumping capacity.

A charge pressure limiting valve 83 that for instance is built in meets the need to limit the backup of an undesirable high charge pressure by means of the blow bore 25 at a low, wintry temperature, or in other words when the pressure fluid is especially viscous. As an alternative, it is naturally also possible for instance in a manner suggested in German Patent DE 38 31 426 C2, to detect undesirably high pressure by means of a microprocessor and to act upon pump operation accordingly. Hence one can limit the electric current to the motor 77, for instance, the consequence of which is a pressure limitation in the first pressure chamber 17 of the master cylinder 3.

At summer temperatures, or in other words when the pressure fluid has low viscosity, the blow bore 25 will generate a lesser pressure rise, but with this low viscosity of the pressure fluid, less of a pressure drop is also needed for flows for filling the return pumps 40 and 41 during filling strokes. If the return pumps 40 and 41 are embodied as self-aspirating return pumps, then it is even possible to ascertain empirically whether the pump 76 can be left off at summer temperatures.

The aforementioned automatic braking may for instance be automatic braking of one or more wheels driven with excess torque, in order to limit drive slip to a favorable range of values. However, the automatic braking can also serve, as described in German Patent DE 42 32 311 C1, to improve the handling of a vehicle equipped with the vehicle brake system according to the invention, especially in cornering or on changing lanes when passing. To that end, the control unit 57 may for instance be assigned a device 85 for measuring the yawing behavior of the vehicle. It does not matter whether, as such a device, a long-known flywheel gyroscope or a more-modern solution, such as an optical gyroscope or an oscillation system that reacts to Coriolis acceleration is used. In other words, the generic term "device for measuring the yawing behavior of the vehicle" accordingly means any device by which the rate of rotation of the vehicle about its vertical axis can be measured, so that while taking into account the actual or estimated speed of the vehicle and the measured steering angle, any tendency of the vehicle to oversteer or understeer becomes detectable and can be corrected via the control unit 57 that trips automatic braking by means of at least one wheel brake.

The backup of pressure for filling the return pump 40 has been described, based on FIG. 2, in conjunction with the blow bore 25 acting as a throttle, which is assigned to brake circuit I to which the return pump 40 belongs. In the description of the master cylinder 3 of FIG. 2, it has already been pointed out that instead of the first piston 10, which with the aforementioned blow bore 25 forms a valve, the blow bore 25 also being usable as a throttle, a different first piston can also be used, which analogously to the second piston 11 has a centering valve 32. Throttling with the pump 76 driven is then effected between the seat face 33 and the closing body 34 and/or in the longitudinal bore 37 along the control tappet 36. If throttling in the ways described by means of commercially available master cylinders proves to be inadequate, then there is no difficulty in drilling blow bores 25 with a smaller diameter, for instance, or providing structurally smaller spacings between seat faces 33 and closing bodies 34 by shortening the control tappet 36. The same is naturally true for the diameter of the longitudinal bore 37 of the control tappet 36 as well.

The hydraulic vehicle brake system 2a of FIG. 4 differs from the vehicle brake system of FIG. 1 in that the engineering effort and expense for the charge pressure limiting valve 83, downstream of the pump 76 of FIG. 1, is spared. A throttle 84, shown outside the pump 76 in FIG. 1 and incorporated into a line leading around the pump, is also shifted into the pump 76a of FIG. 4 and embodied in a manner described below.

In the vehicle brake system 2a of FIG. 4, in accordance with a concentric of the invention, the pump 76a drivable by a motor 77 has a return conduit 92 inside the pump symbol and hence inside a housing not shown in detail; this conduit communicates permanently with both the outlet 91 and the inlet 90 and has a throttling cross section. Whenever panic braking pressure is generated in the master cylinder 4, for instance by means of the brake pedal 23, which pressure through the master brake line 81 and the charge pressure line 80 closes the check valve 78, the effect of this throttle cross section is that with the pump 76a still turned on, a preselected pressure limit will not be exceeded by a return flow of pressure fluid through the return conduit 92 inside the pump 76a. On the one hand, this requires hand an adequate passage from the outlet 91 to the inlet 90, and on the other, the passage must be throttled so that adequate charge pressure will come about; this is shown along the return conduit 92 by means of the symbol for the throttle 84a. A practical exemplary embodiment, which is space-saving compared with the exemplary embodiment of FIG. 1, is shown in FIGS. 6 and 7.

The goal is that, if the pressure fluid used has high viscosity in wintry temperatures, a feed pressure of 5 bar, for instance, will be available in the master brake line 81 for the automatic braking and hence for supplying the return pump 40. Accordingly, the throttle 84a should be dimensioned such that, taking into account a pressure drop that is established while there is a flow through the check valve 78, the pump 76a in the pumping mode furnishes a pressure that is higher by the aforementioned pressure drop than the aforementioned 5 bar whenever the return pump 40 is receiving pressure fluid. If the return pump 40 temporarily requires no pressure fluid, for instance because automatic braking is no longer necessary, yet the pump continues to be driven, for instance for two seconds, the pressure in the master brake line 81 rises. In the final analysis, however, the pressure is kept low in the manner of the invention by a return flow inside the pump 76a, so that the thus-limited pressure causes no problem in the vehicle brake system 2a on the one hand and on the other does not damage either the pump 76a or the motor 77. A closing spring 93 associated with the check valve 78 assures that before a braking operation that can be initiated by the brake peal 23 begins, the check valve 78 is closed so as to prevent an outflow of pressure fluid from the master brake line to the pump 76a and finally to the supply container 3a. This is because if these events were not prevented, they would cause the brake pedal 23 to sag or would even exhaust the pumping capacity of the master cylinder 3 for the duration of the braking operation.

As FIG. 5 shows, the check valve 78 shown in FIG. 4 can be replaced with a differential pressure conduit valve 94, which according to its symbol with the arrow, can have a flow through it only in one direction, namely toward the master brake line 81, as long as a pressure difference between the outlet 91 and the master brake line 81 reaches a preselected value. This value is preselectable by a choice, in a manner known per se and therefore not described here, of the spring 95 that determines the pressure difference. In principle, the differential pressure regulating valve 94 can be embodied structurally identically to the check valve 78, but in terms of circuitry the difference is that check valves 78, secure closing but opening at a slight pressure loss are considered important, while in a differential pressure regulating valve what is sought is higher pressure differences between an inlet and an outlet. In the case of FIG. 5, the spring 95 is selected such that with the pump 76a stopped and the return pump 40 turned on, the latter possibly generates vapor bubbles, during intake strokes, for instance, without causing the differential pressure regulating valve 94 to open. As a result it is attained that any bubbles present inside the vehicle brake system are not air bubbles aspirated from outside through the low-pressure pump 76a. Depending on the pumping property of the pump 76a equipped with the throttle 84a, however, the spring 95 is preferably dimensioned more strongly, so that even if the pump 76a in operation should aspirate air through its inlet 90, the air bubbles will not pass through the differential pressure regulating valve 94 but instead keep as far away as possible from the outlet 91 and flow back through the return conduit 92 to the inlet 90; this is advantageously reinforced by the fact that the pumping capacity of gear wheel pumps or the like force pressure fluid containing air decreases substantially or even vanishes. It will be appreciated accordingly that a differential pressure regulating valve 94 set to a higher standard of pressure difference, compared with a check valve 78 that reacts to a slighter pressure difference, lessens the danger that ambient air will get into the master brake line 81.

Figure 7:
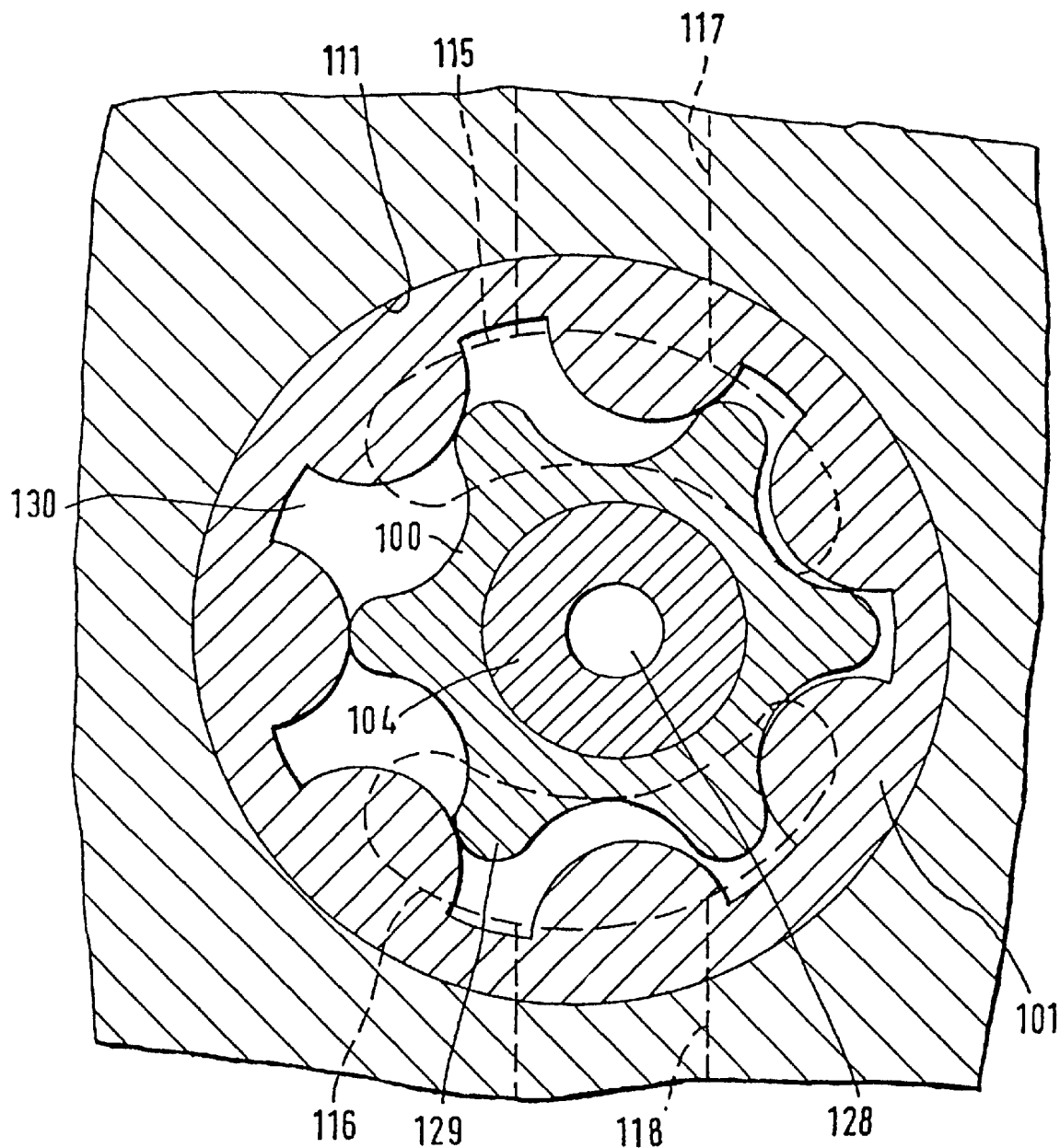
FIG. 7, a detail of the charge pump of FIG. 6 in cross section.

By way of example, the pump 76a is embodied according to FIGS. 6 and 7 with a gear wheel 100 that is drivable by means of the motor 77 and with a so-called internal gear ring 101, which surrounds the gear wheel 100 an meshes with it, and by reason of which the pump 76a is known as an "internal gear ring pump". However, this pump 76a is also known as a "Gerotor pump". The pump 76a also includes a housing 102 and a housing cap 103 and a drive shaft 104 for the gear wheel 100.

The gear wheel 100 is supported and drivable by means of a drive shaft 104, which is for instance press-fitted in place and which has a transversely extending groovelike recess 106 on one end 105 toward the motor 77. A motor shaft 107 protruding from the motor 77 is flattened to form a driver 108; the driver 108 dips into the recess 106, in order to transmit torque. The drive shaft 104 is rotatably supported in a bearing bore 109, located in the housing 102, and a bearing bore 110, located in the housing cap 102.

Joining the bearing bore 109 a bore 111 is disposed in the housing eccentrically, or in other words axially offset, from the bearing bore 109. The bore 111 receives the internal gear ring 101 with little radial play. In the axial direction, the depth of the bore 111 is limited by a face 112 solidly attached to the housing and oriented crosswise to the bore 111. This face 112 is at a preselected spacing from a limiting face 113 toward the housing cap. A cap face 114 rests on this limiting face 113. Between the cap face 114 and the limiting phase 113, there is space, with an axial play described hereinafter, for the gear wheel 100 and the internal gear ring 101.

From the face 112, a first recess 115, curved in an arc around the bearing bore 109, and a second, also-curved recess 116 begin. Both recesses extend over an arc that encloses less than 180°. The recesses are essentially groovelike in embodiment. The first recess 115 is connected by a connection bore 117 to the inlet 90 that is located in the housing 102, and in this way forms an intake conduit that discharges toward the gear wheel 100 and the internal gear ring 101. The outlet 91, which is also located in the housing 103, is connected through a connecting bore 118 to the second recess 116, so that the recess 116 forms a pressure conduit that begins at the gear wheel 100 and the internal gear ring 101. The inlet 90 and the outlet 91 are in the form of threaded connections, for instance.

Toward the motor 77, the housing cap 103 is provided with a tubular extension 119 into which a centering attachment 120 of the motor is inserted. At least one screw 121 is provided for holding together the housing 102, the housing cap 103 and the motor 77. A sealing ring 122 is placed between the housing 102 and the housing cap 103. A further sealing ring 123 assures sealing between the extension 119 and the motor 77. An additional ring 124 sealingly surrounds the motor shaft 107. Inside the extension 119 and thus between the motor 77 and the housing cap 3 is a hollow chamber 125. This chamber is connected, outside the projection of the bore 111, to the connection bore 117 and thus the inlet 90 by a first connecting bore 126, extending through the housing cap 103, and a second connecting bore 127, extending inside the housing 102. A pressure equalizing bore 128 extends through the drive shaft 104.

The gear wheel 100 has six teeth 129, for instance, and correspondingly the internal gear ring 101 has seven gaps 130 between teeth. The shape of the teeth and of the gaps between teeth is not the subject of the invention, because here recourse may be made to a gear wheel and an internal gear ring of the kind available on the market. When the motor 77 drives the gear wheel 100, the internal gear ring 101 is rotated as well. In the process, teeth 129 emerge from gaps 130 between teeth in the region of the recess 115, and teeth 115 successively enter gaps 130 between teeth in the region of the recess 116, with the consequence, known per se, that from the first recess 115, pressure fluid flows in toward between the gear wheel 100 and the internal gear ring 101 and is subsequently forced out of it and into the second recess 116. Accordingly, if the direction of rotation of the drive shafts 104 is correctly chosen, a pressure will be established at the outlet 91 that is higher than a pressure at the inlet 90. Expressed in other terms: Between the second recess 116 and the first recess 115, a pressure drop arises.

This pressure drop, because of the already-mentioned axial play of the gear wheel 100 between the face 112 and the cap face 114, and also the axial play of the internal gear ring 101 between these faces 112 and 114, leads to leakage flows, or in other words return flows inside the pump 76a. Volumetric flows caused thereby are all the greater, the greater the pressure drop, the greater the axial play, and the less viscous the pressure fluid, for instance from heating during pumping operation or in summer temperatures. The two axial plays are of equal magnitude, for instance, and are therefore both identified by reference numeral 131 in FIG. 6. For the sake of simplicity, the axial plays between the gear wheel 100 or the internal gear ring 101 and the face 112 are also shown as being of equal magnitude. It can be seen from this that the aforementioned pressure drop in the cross section determined by the axial play 131 forces pressure fluid out of the region of the second recess 116 around the drive shaft 104 into the region of the first recess 115. In a way according to the invention, at least one of these axial plays is selected to be greater than in commercially available pumps, in order that because of the increased return flow compared with commercially available pumps a pump pressure limitation will result in the manner described in conjunction with FIG. 4; as a result, the charge pressure limiting valve 83 can be omitted from the vehicle brake system of FIG. 1, thus saving both expense and weight.

As already suggested, the increased axial play is assigned for instance only to the gear wheel 100. This is attained by using a commercially available internal gear ring 101 and by post-machining a commercially available gear wheel 100 to shorten it. To that end, a gear wheel 100 for instance of sintered steel may be magnetically fixed and ground on its face end. It will be appreciated that the gear wheel 100, because of its smaller diameter than the larger diameter of the internal gear ring 101, can be post-machined less expensively. As a result of this post-machining, that is, the axial play 131 brought about thereby, the functional advantage already suggested above also comes about that if pressure fluid containing air, or air alone, is aspirated then the aspirated material finds its way easily enough from the second recess 116 to the first recess 115 in cross sections defined by the axial play 131. This is because as a result of the air bubbles or gas bubbles, the fluid involved in the axial play has less kinematic viscosity than air-free pressure fluid. Air bubbles or gas bubbles or even air alone therefore have the effect that the pump 76a furnishes no significant pressure to the outlet 91.

Additional return conduits are present because of the disposition of the equalization bore 128 and the connecting bores 126 and 127, and because of an unavoidable bearing play between the drive shaft 104 and the bearing bore 109 as well as an equally unavoidable bearing play between the drive shaft 104 and the bearing bore 110. These return conduits are taken into account in choosing the axial play 131. The reason why additional return conduits are present is that along the way from the region of the first recess 115 to the region of the second recess 116, teeth 129 emerge from gaps 130 between teeth in the internal gear ring 101. In the concept of the invention, in the existing return conduits preferably only the axial play 131 is dimensioned differently from usual, in order to attain the stated object. It will be appreciated that the at least one return conduit, which originates at the recess 116 and leads to the recess 115, forms a so-called laminar throttle because of liquid friction along the face 112 and along the face ends of the gear wheel 100 and the internal gear ring 101. Since in the concept of the invention a selected throttling is important, the symbol of the throttle 84a has been shown in FIG. 4 inside the symbol of the pump 76a.

Because of the further development of the intrinsically unavoidable housing cap 102 to form a fastening element because of the provision of the extension 119 for the motor 177, the structural unit comprising the motor 77 and the pump 76a can be manufactured inexpensively.

The concept of the invention of purposefully generating return flows to limit pump pressure can also be adopted for other gear wheel pumps, which for instance have pairs of spur gears or other toothed, meshing pump elements. In addition it should be pointed out that the pump 76 embodied according to the invention can also be used to charge a return pump, without the detour through the master brake line indicated in FIGS. 1 and 4.

Figure 8:
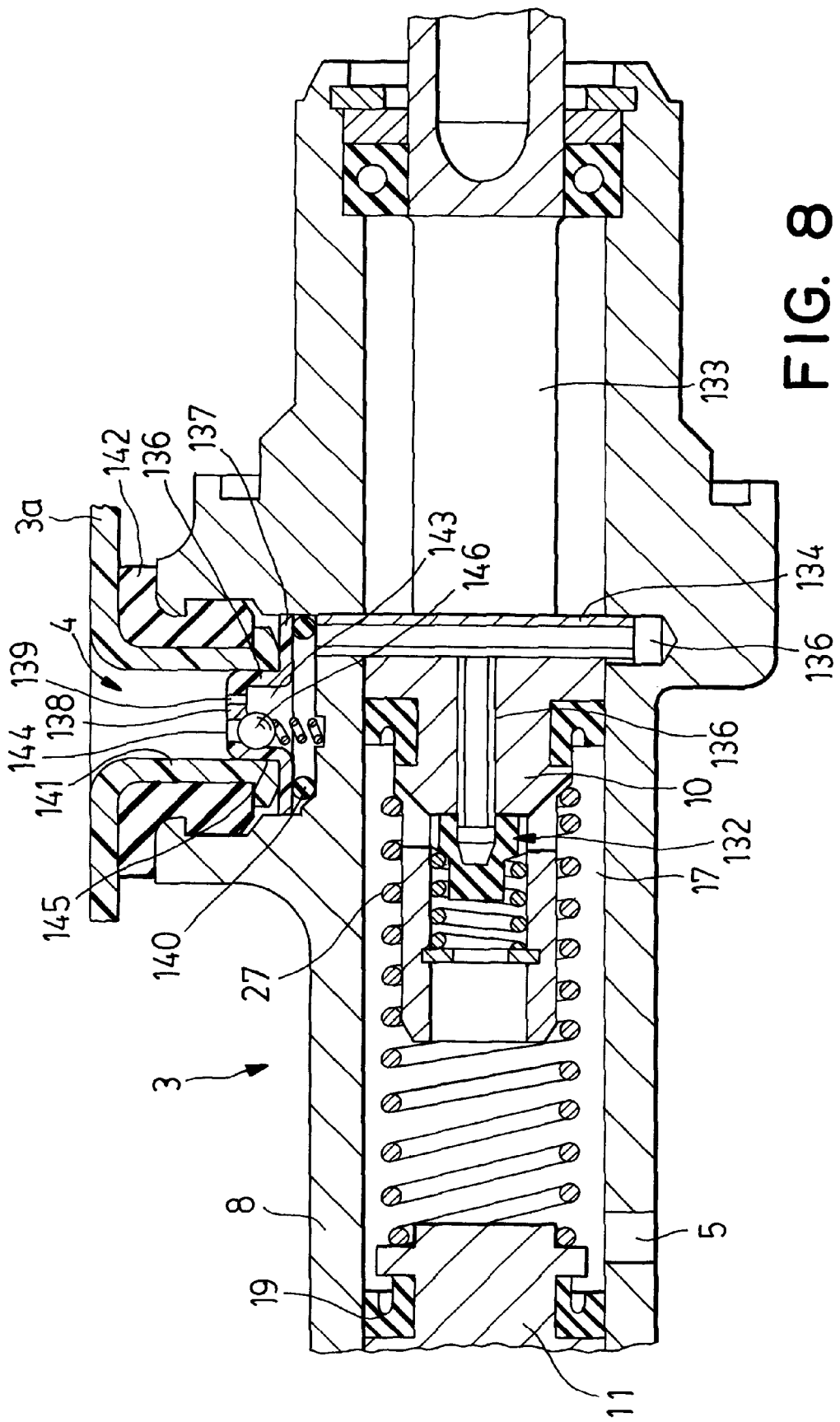
FIG. 8, a modified embodiment of the master cylinder shown in FIG. 2, seen in the region of its first connection, according to the invention.
Figure 9:
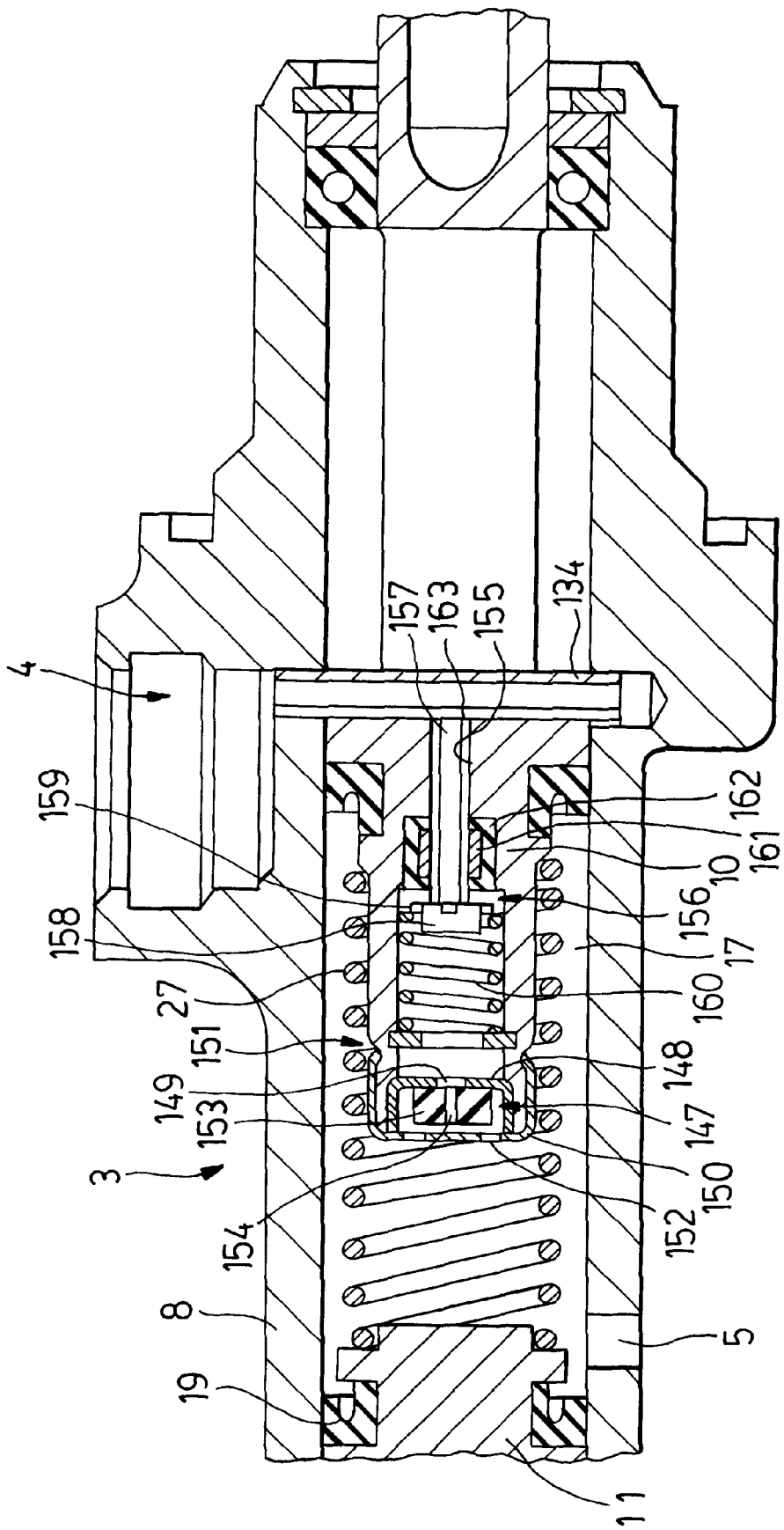
FIG. 9, a further modification according to the invention of the master cylinder shown in FIG. 2.

FIGS. 8 and 9 show modifications of the master cylinder 3 shown in FIG. 2. To avoid repetition, the same reference sizes as in FIG. 2 have been chosen for identical components, and to that extent reference is made to those descriptions.

Like the second piston 11 of the master cylinder 3 shown in FIG. 2, the first piston 10, actuatable by means of a brake pedal, not shown, of the master cylinder 3 shown in FIG. 8 has a central valve 132. On its side remote from the first pressure chamber 17, the piston 10 is provided with a longitudinal slit 133 for limiting its displacement travel; a tension sleeve 134 is passed crosswise through this slit and retained in a transverse bore 135 in the housing 8 of the master cylinder 3. The transverse bore 135 is accessible through the first connection 4 of the master cylinder 3.

To form a flow-hindering constriction, in order as described above to be able to build up pressure in both pressure chambers 17, 18 of the master cylinder 3 and thus in both brake circuits I, II of the vehicle brake system 2 of the invention by means of a low-pressure pump 76, 76a, which pumps into the master brake line 81 of the first brake circuit I connected to the first pressure chamber 17 of the master cylinder 3, a throttle element 136 is inserted into the first connection 4 of the master cylinder 3, which connection communicates with the first pressure chamber 17.

The throttle element 136, which is of plastic, is cup-shaped and merges on its free circumferential edge integrally with a radial flange 137; the radial flange 137 of the master cylinder 3 and a bottom 138 of the cup-shaped throttle element 136 are oriented toward the brake fluid supply container 3a. The bottom 138 has a throttle bore 139.

The throttle element 136 is sealed off by means of an O-ring 140 placed in the connection 4 of the master cylinder 3 under the radial flange 137 of the throttle element 136. The throttle element 136 is retained on its radial flange 137 by a connection coupling 141 of the supply container 3a; this coupling protrudes into the connection 4 of the master cylinder 3 and is retained there in a manner known per se by means of a shaped rubber ring 142.

In addition to the throttle bore 139, the throttle element 136 has a check valve 143, which is connected parallel to the throttle bore 139 and through which a flow is possible in the direction from the supply container 3a to the master cylinder 3: Besides the throttle bore 139, the bottom 138 of the throttle element 136 has a valve bore 144 with a larger diameter than the throttle bore 139. A compression spring 145, which is supported on the bottom of the first connection 4 of the master cylinder 3, presses a valve ball 146 against a mouth of the valve bore 144.

The check valve 143 is intended for filling of the vehicle brake system 2 of the invention. With its large flow cross-sectional area plus the cross-sectional area of the throttle bore 139, it increases a flow of brake fluid through the first connection 4 of the master cylinder 3 into the first brake circuit I when the brake system 2 is being filled.

In the exemplary embodiment shown in FIG. 9 of the master cylinder 3, a throttle element 147 with an integrated check valve is mounted on a face end of the first piston 10 oriented toward the first pressure chamber 17 of the master cylinder 3. A valve seat cup 148 with a central hole 149 is inserted into the face end of the piston 10 toward the first pressure chamber 17 and is retained by means of a retaining cap 150 fitted over the face end of the first piston 10; this cap fits around the circumference of the first piston 10 and is fixed by crimping of its free end into an encompassing groove 151 on the first piston 10. The valve seat cup 148 has a central hole 149 in its bottom. The retaining cap 150 has a plurality of through bores 152. A rubber valve disk 153 with an axial throttle conduit 154 is received in the interior between the valve seat cup 148 and the retaining cap 152. If an overpressure prevails in the first pressure chamber 17, the valve disk 153 is pressed against the bottom of the valve seat cup 148, so that brake fluid can flow only through the throttle conduit 154 of the valve disk 153 and the central hole 149 of the valve seat cup 148. Conversely, for instance if the vehicle brake system 2 is being filled, if a higher pressure prevails in the first connection 4 of the master cylinder 3 than in the first pressure chamber 17, then brake fluid flows through the first connection 4, the tension sleeve 134, an axial bore 155 of the first piston 10, and through the central hole 149 of the valve seat cup 148, lifts the valve disk 153, and flows on through the bores 153 of the retaining cap 150 into the first pressure chamber 17. Accordingly, the valve disk 153 with its throttle conduit 154 acts in the direction from the first pressure chamber 17 to the first connection 4 as a throttle element and at the same time acts as a check valve through which there can be a flow in the opposite direction.

The first piston 10 of the master cylinder 3 shown in FIG. 9, like that of FIG. 8 and the second piston 11 of the master cylinder 3 shown in FIG. 2, has a central valve 156. However, the central valve 156 of the master cylinder 3 shown in FIG. 9 is modified: On its tappet 157 that penetrates the axial bore 155 of the first piston 10, it has a cylinder head 158 with radially protruding lugs 159 against which a compression spring 160 presses to close the central valve 156. A sealing element with a metal support ring 161, surrounded by rubber 162, is inserted into a countersunk recess of the axial bore 155. As in the second piston 11 in FIG. 2, the central valve 156, when the first piston 10 is not actuated, is opened by the tappet 157, which rests on the tension sleeve 134. Interstices between the radially protruding lugs 159 and continuous longitudinal bores 163 of the tappet 157 form large flow cross sections for brake fluid.

If the first piston 10, for actuating the vehicle brake system 2, presses into the housing 8 of the master cylinder, the tappet 157 moves free of the tension sleeve 134, and its head is pressed by the compression spring 160 against the sealing element 161, 162. The axial bore 155 of the first piston 10 is thereby closed.

The foregoing relates to preferred exemplary embodiments of the invention, it being understood that other variants and embodiments thereof are possible within the spirit and scope of the invention, the latter being defined by the appended claims.

We claim:

1. A hydraulic vehicle brake system for braking by brake pedal actuation and for automatic braking, having a master cylinder, which has a housing, a bore in said housing, a first displaceable piston in said bore, said piston is displaceable as a function of the depression of a brake pedal, a second piston on a side of the first piston opposite the brake pedal, a first pressure chamber between the first and second pistons, said chamber communicates with both a first connection and a second connection, and a second pressure chamber, adjacent to the second piston on a side opposite the first pressure chamber, with a third connection embodied on the housing and a fourth connection, there being no hydraulic communication when the brake pedal is depressed between the first and second connection and between the third and fourth connection; a supply container for pressure fluid, the supply container being associated with the first and third connections of the master cylinder; means by which upon automatic braking at least a fluid flow through the first pressure chamber of the master cylinder to the supply container can be at least hindered; a pump device, said pump device has a suction connection that communicates with the supply container and a pressure connection that communicates with the second connection of the master cylinder for aspirating pressure fluid from the supply container and pumping the aspirated fluid to the second connection of the master cylinder; a plurality of wheel brake cylinders for associated wheels, said brake cylinders are subdivided into a first group and a second group; first brake pressure modulation valve assemblies, which are disposed between the second connection of the master cylinder and the first group of wheel brake cylinders; second brake pressure modulation valve assemblies, which are disposed between the fourth connection of the master cylinder and the second group of wheel brake cylinders; a control unit for performing automatic braking when the pump device is turned on, the pump device (76, 76a) is embodied as a low-pressure pump; that return pumps (40, 41) that can be turned on for an anti-lock mode are associated with the first and second brake pressure modulation valve assemblies (42, 43, 44, 45); that the return pumps (40, 41) are connectable through multiposition valves (68, 69) to the second connection (5) and the fourth connection (7) of the master cylinder (3); and that in an automatic braking mode, with the brake pedal (23) not actuated, at least one flow-hindering constriction (25, 33, 34; 36, 37, 136, 139; 147) is operative between the supply container (3a) and the second connection (5) of the master cylinder (3), in such a way that with the low-pressure pump (76, 76a) turned on, charge pressure is available to the return pumps (40, 41).

2. A vehicle brake system in accordance with claim 1, in which the constriction is formed by a blow bore (25) acting as a throttle, said constriction is located between the bore (9) of the housing (8) and the first connection (4).

3. A vehicle brake system in accordance with claim 2, in which a check valve (143) is connected parallel to the flow-hindering constriction (25; 33, 34; 36, 37; 136, 139; 147), the check valve being capable of having a flow through it in the direction from the supply container (3a) to the first pressure chamber (17).

4. A vehicle brake system in accordance with claim 1, in which the constriction acting as a throttle is formed by a seat face (33) and a closing body (34) of a central valve (32) of the first piston.

5. A vehicle brake system in accordance with claim 4, in which a check valve (143) is connected parallel to the flow-hindering constriction (25; 33, 34; 36, 37; 136, 139; 147), the check valve being capable of having a flow through it in the direction from the supply container (3a) to the first pressure chamber (17).

6. A vehicle brake system in accordance with claim 1, in which the constriction acting as a throttle is formed between a longitudinal bore (37) and a control tappet (36), displaceable through this bore, of a central valve (32) that has a seat face (33) adjacent to the longitudinal bore (37) and a closing body (35) carried by the control tappet (36) and associated with the first piston.

7. A vehicle brake system in accordance with claim 6, in which a check valve (143) is connected parallel to the flow-hindering constriction (25; 33, 34; 36, 37; 136, 139; 147), the check valve being capable of having a flow through it in the direction from the supply container (3a) to the first pressure chamber (17).

8. A hydraulic vehicle brake system in accordance with claim 1, in which the pump (76a) embodied as a low-pressure pump, has a housing (102), a housing cap (103), an inlet (90) and an outlet (91); and that inside the housing (102, 103), at least one return conduit (92) that connects the outlet (91) to the inlet (90) is present, whose cross section, for the function as a throttle (84a), is dimensioned such that if there is a hindered outflow of pressure fluid from the pump (76a) through its outlet (91), and at a predetermined viscosity of the pressure fluid and a predetermined drive rpm for the pump (76a) for return flow of pressure fluid through the throttle (84a), a pressure limitation to a desired value occurs; and that disposed between the outlet (91) of the pump (76a) and the second connection (5) of the master cylinder (4) is a valve (78, 94) through which the flow can be in the direction of the master cylinder.

9. A vehicle brake system in accordance with claim 8, in which the pump (76a) has rotatable pump elements (100, 101) with teeth (129) and gaps (130) between teeth; that a face (112) located in the housing (102) is oriented on the face end toward the pump elements (100, 101), with a first intake-side recess (115) communicating with the inlet (90) and a second pressure-side recess (116) communicating with the outlet (91); and that the at least one return conduit (92) extends from the second pressure-side to the first intake-side recess (115), and the at least one return conduit (92) forms a throttle (84a) by selection of a magnitude of the axial play (131) between the face (112) and at least one of the rotatable pump elements (100, 101).

10. A vehicle brake system in accordance with claim 9, in which a first pump element is embodied as a gear wheel (100), and that a second pump element is embodied as an internal gear ring (101), including a number of gaps (130) between teeth that is greater by the value of 1 than the number of teeth (129) of the gear wheel (100), and the at least one return conduit (92) extends at least along one of the two pump elements (100, 101).

11. A vehicle brake system in accordance with claims 8, in which the valve (78) through which a flow can occur is embodied as a check valve with a closing spring (93).

12. A vehicle brake system in accordance with claim 8, in which the valve (94) is embodied as a differential pressure control valve that can open in one direction.

13. A vehicle brake system in accordance with claim 12, in which a check valve (143) is connected parallel to the flow-hindering constriction (25; 33, 34; 36, 37; 136, 139; 147), the check valve being capable of having a flow through it in the direction from the supply container (3a) to the first pressure chamber (17).

14. A vehicle brake system in accordance with claim 8, in which the pump (76a) is assigned a motor (77), and that combining the pump (76a) and the motor (77) into a structural unit, the housing cap (103) has an extension (119) oriented toward the motor (77).

15. A vehicle brake system in accordance with claim 14, in which a check valve (143) is connected parallel to the flow-hindering constriction (25; 33, 34; 36, 37; 136, 139; 147), the check valve being capable of having a flow through it in the direction from the supply container (3a) to the first pressure chamber (17).

16. A vehicle brake system in accordance with claim 1, in which the master cylinder (3) has a throttle element (136, 139), inserted into its first connection (4), as a flow-hindering constriction.

17. A vehicle brake system in accordance with claim 16, in which a check valve (143) is connected parallel to the flow-hindering constriction (25; 33, 34; 36, 37; 136, 139; 147), the check valve being capable of having a flow through it in the direction from the supply container (3a) to the first pressure chamber (17).

18. A vehicle brake system in accordance with claim 1, in which the first piston (10) has a throttle element (147) mounted on a face end toward the first pressure chamber (17) as a flow-hindering constriction.

19. A vehicle brake system in accordance with claim 18, in which a check valve (143) is connected parallel to the flow-hindering constriction (25; 33, 34; 36, 37; 136, 139; 147), the check valve being capable of having a flow through it in the direction from the supply container (3a) to the first pressure chamber (17).

20. A vehicle brake system in accordance with claim 1, in which a check valve (143) is connected parallel to the flow-hindering constriction (25; 33, 34; 36, 37; 136, 139; 147), the check valve being capable of having a flow through it in the direction from the supply container (3a) to the first pressure chamber (17).

* * * * *